US005717568A

United States Patent [19]

Clutter et al.

[11] Patent Number: 5,717,568

[45] Date of Patent: Feb. 10, 1998

[54] TELESCOPING DRIVE-THROUGH MENU SYSTEM

[76] Inventors: Tommy Clutter, 2425 38th St. NE., Canton, Ohio 44705; Ethan Greenberg, 345 Bainbridge St. NW., N. Canton, Ohio 44720

[21] Appl. No.: 704,915

[22] Filed: Aug. 30, 1996

[51] Int. Cl.[6] .................... G06F 1/16; E04H 3/04

[52] U.S. Cl. .................... 361/683; 455/66; 340/286.09; 186/41

[58] Field of Search .................... 361/683, 680, 361/681, 725; 235/381, 383; 455/66, 227; 340/286.09, 286.01; 379/159, 160; 186/41, 36, 37, 52, 53; G06F 1/16

[56] References Cited

U.S. PATENT DOCUMENTS

| | | | |
|---|---|---|---|
| 3,686,630 | 8/1972 | Zubay | 340/149 A |
| 5,053,868 | 10/1991 | Higgins et al. | 358/93 |
| 5,287,948 | 2/1994 | Casale et al. | 186/41 |
| 5,410,326 | 4/1995 | Goldstein | 348/134 |
| 5,590,407 | 12/1996 | Ishikawa et al. | 455/66 |

*Primary Examiner*—Leo P. Picard
*Assistant Examiner*—Lynn D. Feild

[57] ABSTRACT

A new Telescoping Drive-Through Menu System for increasing the drive-through process by eliminating mis-communications that occur mesial the customer and the employee, and further providing a support which retracts the menu into a cavity thereby protecting the menu from vandalism. The inventive device includes a vertical support which is telescoping, an activating pressure plate which detects when a vehicle is present, and a menu ordering system secured to the upper portion of the vertical support allowing entry of the desired order through a slanted keyboard.

3 Claims, 3 Drawing Sheets

TELESCOPING DRIVE-THROUGH MENU SYSTEM

BACKGROUND OF THE INVENTION

1. Field of the Invention

The present invention relates to Ordering Devices and more particularly pertains to a new Telescoping Drive-Through Menu System for increasing the drive-through process by eliminating miscommunications that occur mesial the customer and the employee, and further providing a support means which retracts the menu into a cavity thereby protecting the menu from vandalism.

2. Description of the Prior Art

The use of Ordering Devices is known in the prior art. More specifically, Ordering Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Ordering Devices include U.S. Pat. No. 5,235,509; U.S. Pat. No. 4,675,515; U.S. Pat. No. 321,724;U.S. Pat. No. 4,300,040; U.S. Pat. No. 5,168,354 and U.S. Pat. No. 4,553,222.

While these devices fulfill their respective, particular objectives and requirements, the aforementioned patents do not disclose a new Telescoping Drive-Through Menu System. The inventive device includes a vertical support means which is telescoping, an activating pressure plate which detects when a vehicle is present, and a menu ordering system secured to the upper portion of the vertical support means allowing entry of the desired order through a slanted keyboard.

In these respects, the Telescoping Drive-Through Menu System according to the present invention substantially departs from the conventional concepts and designs of the prior art, and in so doing provides an apparatus primarily developed for the purpose of increasing the drive-through process by eliminating miscommunications that occur mesial the customer and the employee, and further providing a support means which retracts the menu into a cavity thereby protecting the menu from vandalism.

SUMMARY OF THE INVENTION

In view of the foregoing disadvantages inherent in the known types of Ordering Devices now present in the prior art, the present invention provides a new Telescoping Drive-Through Menu System construction wherein the same can be utilized for increasing the drive-through process by eliminating miscommunications that occur mesial the customer and the employee, and further providing a support means which retracts the menu into a cavity thereby protecting the menu from vandalism.

The general purpose of the present invention, which will be described subsequently in greater detail, is to provide a new Telescoping Drive-Through Menu System apparatus and method which has many of the advantages of the Ordering Devices mentioned heretofore and many novel features that result in a new Telescoping Drive-Through Menu System which is not anticipated, rendered obvious, suggested, or even implied by any of the prior art Ordering Devices, either alone or in any combination thereof.

To attain this, the present invention generally comprises a vertical support means which is telescoping, an activating pressure plate which detects when a vehicle is present, and a menu ordering system secured to the upper portion of the vertical support means allowing entry of the desired order through a slanted keyboard.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Telescoping Drive-Through Menu System apparatus and method which has many of the advantages of the Ordering Devices mentioned heretofore and many novel features that result in a new Telescoping Drive-Through Menu System which is not anticipated, rendered obvious, suggested, or even implied by any of the prior art Ordering Devices, either alone or in any combination thereof.

It is another object of the present invention to provide a new Telescoping Drive-Through Menu System which may be easily and efficiently manufactured and marketed.

It is a further object of the present invention to provide a new Telescoping Drive-Through Menu System which is of a durable and reliable construction.

An even further object of the present invention is to provide a new Telescoping Drive-Through Menu System which is susceptible of a low cost of manufacture with regard to both materials and labor, and which accordingly is then susceptible of low prices of sale to the consuming public, thereby making such Telescoping Drive-Through Menu System economically available to the buying public.

Still yet another object of the present invention is to provide a new Telescoping Drive-Through Menu System which provides in the apparatuses and methods of the prior art some of the advantages thereof, while simultaneously overcoming some of the disadvantages normally associated therewith.

Still another object of the present invention is to provide a new Telescoping Drive-Through Menu System for increasing the drive-through process by eliminating miscommunications that occur mesial the customer and the employee, and further providing a support means which retracts the menu into a cavity thereby protecting the menu from vandalism.

Yet another object of the present invention is to provide a new Telescoping Drive-Through Menu System which includes a vertical support means which is telescoping, an activating pressure plate which detects when a vehicle is present, and a menu ordering system secured to the upper portion of the vertical support means allowing entry of the desired order through a slanted keyboard.

Still another object of the present invention is to provide a new Telescoping Drive-Through Menu System that utilizes state of the art animation on the video screen.

Even still another object of the present invention is to provide a new Telescoping Drive-Through Menu System that includes a backup speaker in the situation where the user is unable to utilize the slanted keyboard for entry of the order.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
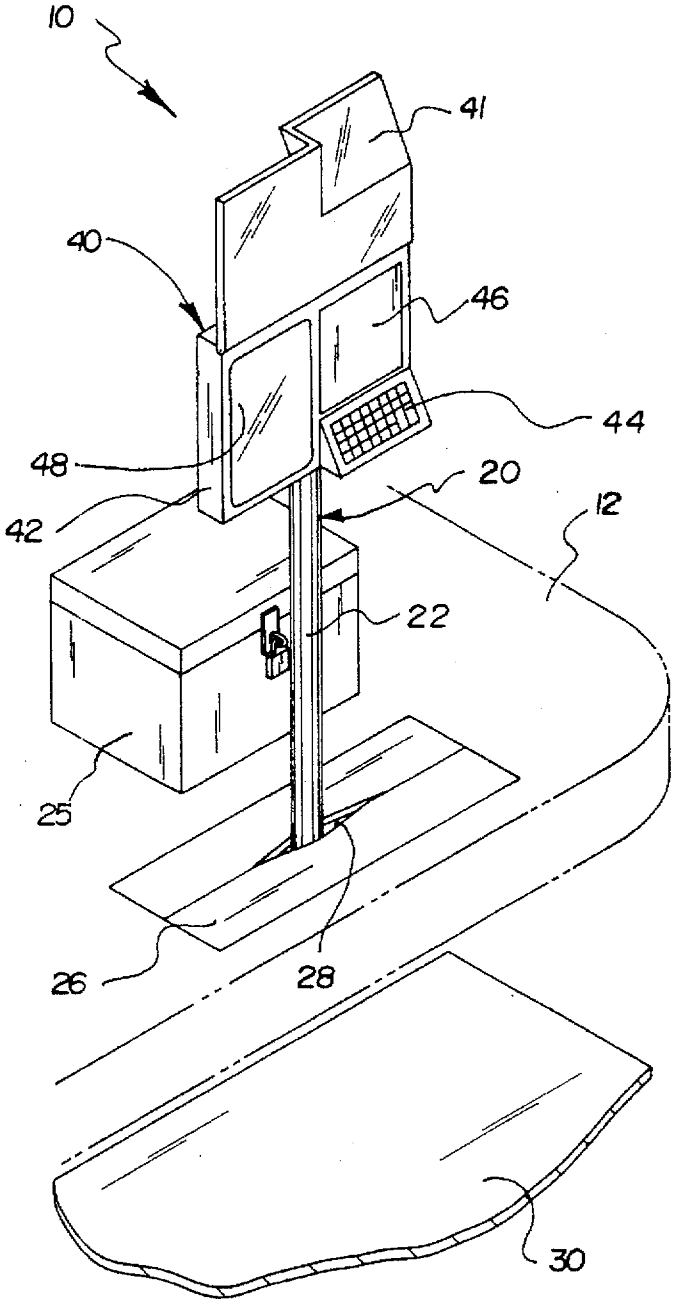
FIG. 1 is a perspective view of a new Telescoping Drive-Through Menu System according to the present invention.

With reference now to the drawings, and in particular to FIGS. 1 through 6 thereof, a new Telescoping Drive-Through Menu System embodying the principles and concepts of the present invention and generally designated by the reference numeral 10 will be described.

More specifically, it will be noted that the Telescoping Drive-Through Menu System 10 comprises a storage cavity 28 within ground 12, a vertical support means 20 secured within the storage cavity 28 completely, and a menu ordering system 40 secured to the upper portion of the vertical support means 20.

Figure 2:
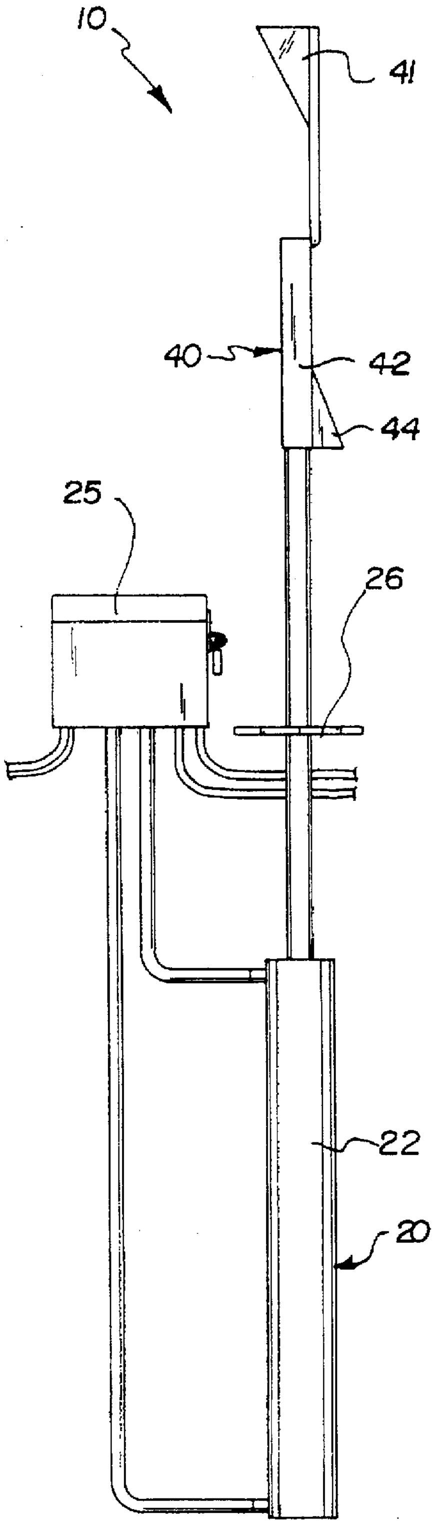
FIG. 2 is a side view thereof.
Figure 3:
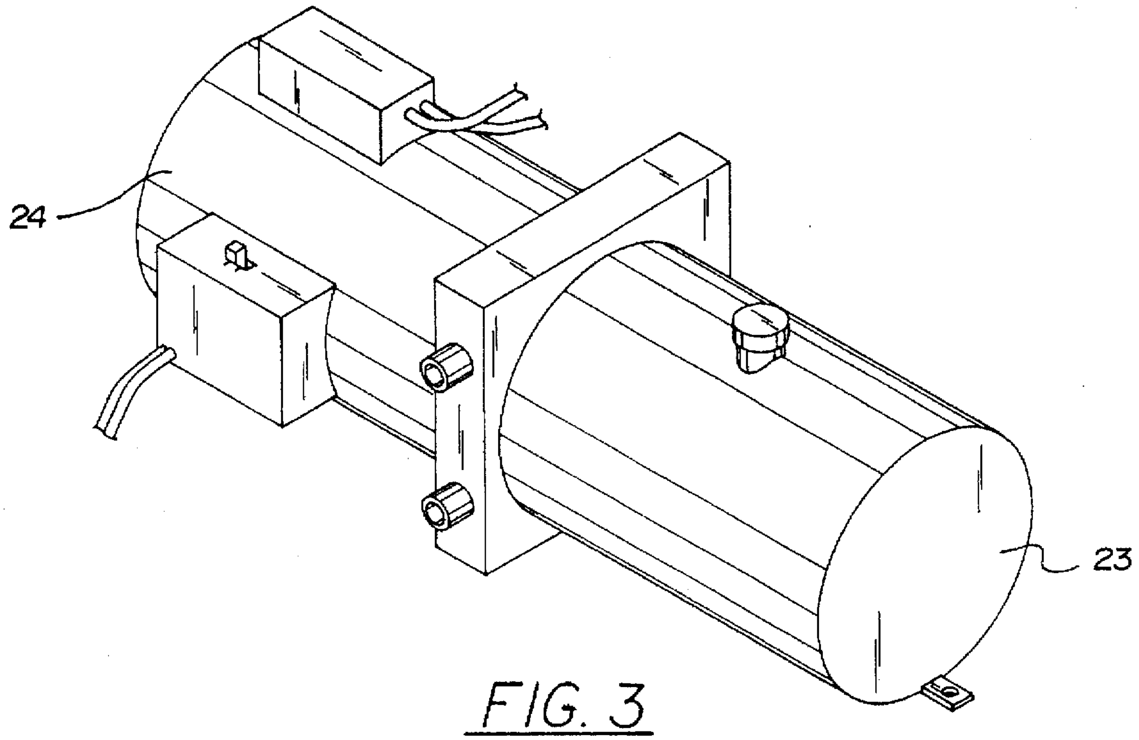
FIG. 3 is a perspective view of the motorized pump.
Figure 4:
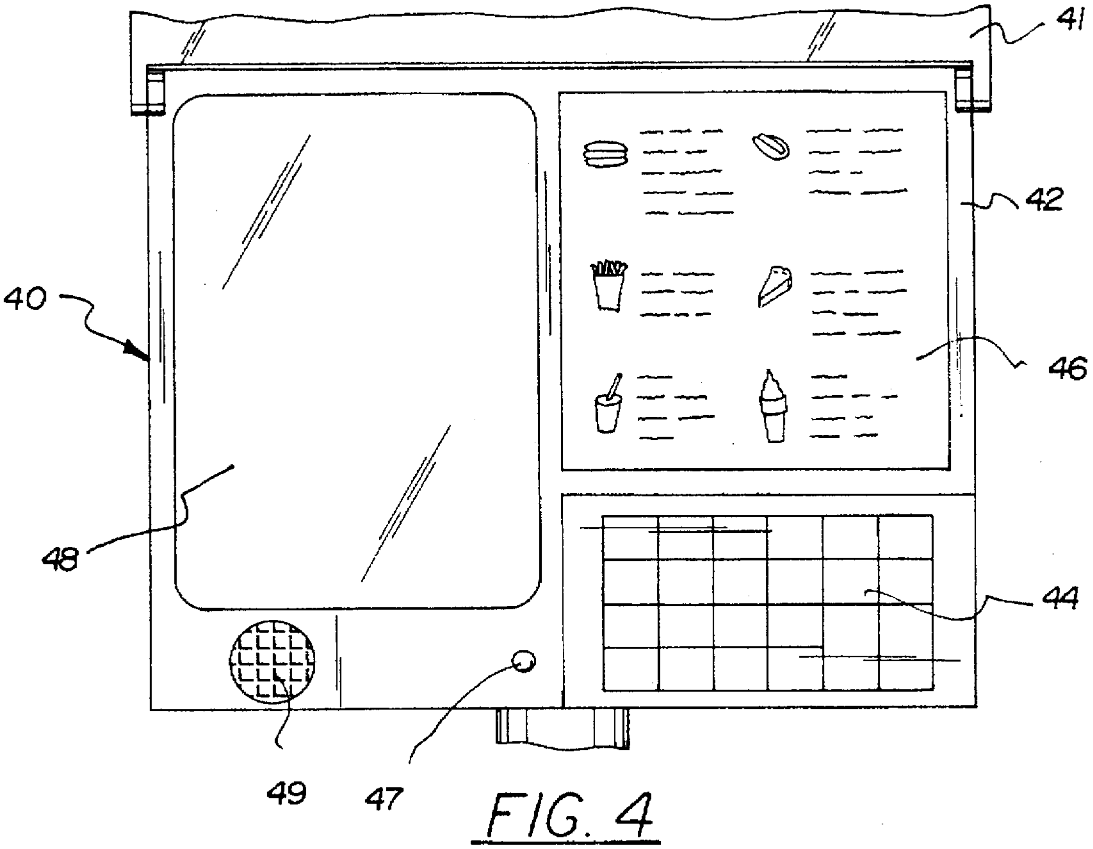
FIG. 4 is a front view of the menu ordering system.
Figure 5:
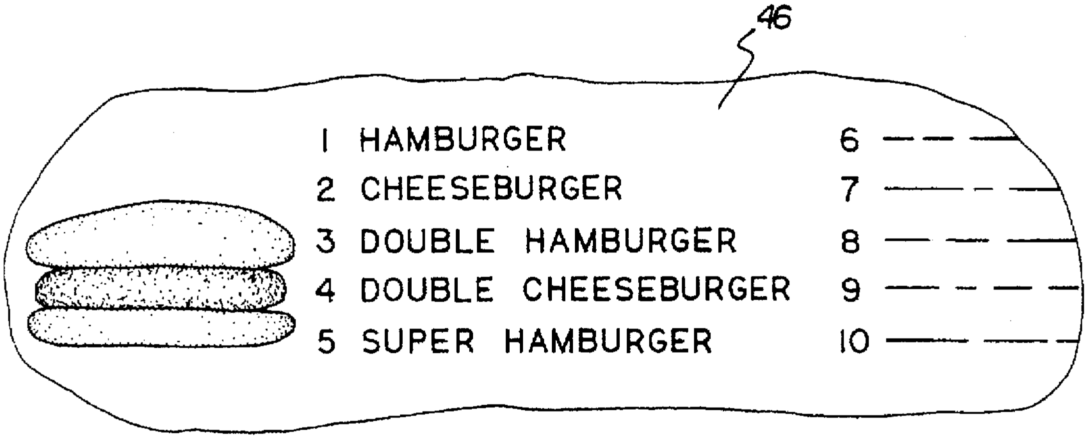
FIG. 5 is a magnified view of the menu display.

As best illustrated in Figures I and 2, it can be shown that the vertical support means 20 includes a hydraulic cylinder 22 completely encased within the storage cavity 28 when in the retracted position. A motorized pump 24 is fluidly connected to the hydraulic cylinder 22 and fluidly connected to a hydraulic reservoir 23. Said motorized pump 24 and hydraulic reservoir 23 are encased by a pump box 25 secured to the cornice of the ground 12 near the storage cavity 28 as best shown in FIG. 2 of the drawings. A slotted rubber mat 26 covers the opening of the storage cavity 28 as shown in Figure I of the drawings. The slotted rubber mat 26 allows passage of the menu ordering system 40 and the hydraulic cylinder 22 when extended. The vertical support means 20 includes an activating pressure plate 30 electronically connected to the motorized pump 24 thereby controlling said motorized pump 24. The activating pressure plate 30 activates the motorized pump 24 only when a significant mass, such as a vehicle, is positioned on the cornice of the activating pressure plate 30. The menu ordering system 40 includes a swaged encasement 42 as best shown in FIGS. 1 and 4 of the drawings. A menu display 46 is secured to the swaged encasement 42. The swaged encasement 42 includes a video screen 48 electronically connected to an unnumbered video camera recording an unnumbered employee's image. The swaged encasement 42 includes a miniature camera 47 recording the unnumbered customer's image and electronically connected to an unnumbered screen within the business. The swaged encasement 42 includes a slanted keyboard 44 electronically connected to the video screen 48 and an unnumbered ordering system within the business. The swaged encasement 42 includes a backup speaker 49 electronically connected to the unnumbered ordering system. A protective transparent cover 41 is pivotally secured to the upper edges of the swaged encasement 42.

Figure 6:
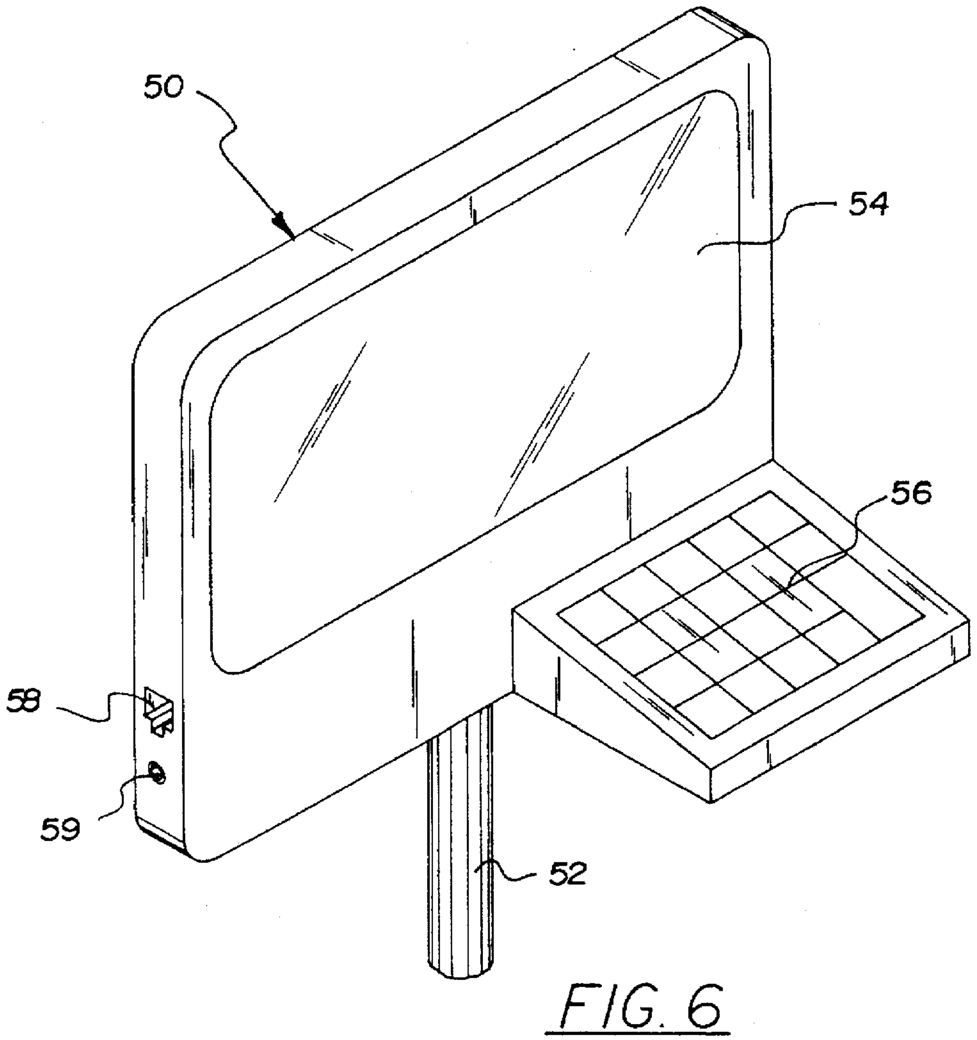
FIG. 6 is an alternative embodiment displaying an indoor menu system.

In an alternative embodiment as shown in FIG. 6 of the drawings, an indoor menu system 50 includes a vertical support pole 52 secured to an unnumbered floor at one end. A video display screen 54 is secured to the end of the vertical support pole 52 opposite of the floor. An indoor keyboard 56 is secured to the video display screen 54. A connecting port 58 is electronically connected to the indoor keyboard 56 at one end and electronically connected to the unnumbered ordering system at the opposite end. A communications port 59 allows connection of an unnumbered headset including a microphone and a speaker. The communications port 59 is electronically connected to the ordering system allowing communication between a customer and an employee.

In use, the unnumbered customer driving an unnumbered vehicle positions the unnumbered vehicle on the cornice of the activating pressure plate 30. Thereafter, the activating pressure plates transmits a signal to the motorized pump 24 which extends the hydraulic cylinder 22. The menu ordering system 40 secured to the upper portion of the hydraulic cylinder 22 is thereby projected through the slotted rubber mat 26 until positioned near the unnumbered vehicle's window. The user then visually scans the menu display 46 and enters the desired order through the slanted keyboard 44. The slanted keyboard 44 electronically transmits the desired order the unnumbered ordering system whereby the order may be filled.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Telescoping Drive-Through Menu System comprising:

a storage cavity within ground;

a vertical support means secured within the storage cavity completely; and a menu ordering system secured to the upper portion of the vertical support means; the vertical support means includes:

a hydraulic cylinder completely encased within the storage cavity when in the retracted position;

a motorized pump fluidly connected to the hydraulic cylinder and fluidly connected to a hydraulic reservoir, where said motorized pump and hydraulic reservoir are encased by a pump box secured to the cornice of the ground near the storage cavity; and a slotted rubber mat covering the opening of the storage cavity, where the slotted rubber mat allows passage of the menu ordering system and the hydraulic cylinder when extended.

2. The Telescoping Drive-Through Menu System of claim 1, wherein the vertical support means includes an activating pressure plate electronically connected to the motorized pump thereby controlling said motorized pump, where the activating pressure plate only activates the motorized pump when a significant mass such as a vehicle is positioned on the cornice of the activating pressure plate.

3. The Telescoping Drive-Through Menu System of claim 2, wherein the menu ordering system includes:

a swaged encasement;

a menu display secured to the swaged encasement;

the swaged encasement includes a video screen electronically connected to a video camera recording an employee's image;

the swaged encasement includes a miniature camera recording the customer's image and electronically connected to a screen;

the swaged encasement includes a slanted keyboard electronically connected to the video screen and an ordering system;

the swaged encasement includes a backup speaker electronically connected to the ordering system; and a protective transparent cover pivotally secured to the upper edges of the swaged encasement.

* * * * *